United States Patent
Perikala et al.

(10) Patent No.: US 11,984,036 B2
(45) Date of Patent: May 14, 2024

(54) SYSTEMS AND METHODS FOR OPTIMIZING HOLDING PATTERN MANEUVER IN A CONNECTED ENVIRONMENT

(71) Applicant: HONEYWELL INTERNATIONAL INC., Charlotte, NC (US)

(72) Inventors: Kiran Perikala, Charlotte, NC (US); Tulasi Mohan Naraharisetty, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 502 days.

(21) Appl. No.: 17/190,895

(22) Filed: Mar. 3, 2021

(65) Prior Publication Data
US 2021/0350711 A1 Nov. 11, 2021

(30) Foreign Application Priority Data
Mar. 9, 2020 (IN) .............................. 202041010064

(51) Int. Cl.
*G08G 5/00* (2006.01)
*G06N 20/00* (2019.01)

(52) U.S. Cl.
CPC ............ *G08G 5/006* (2013.01); *G06N 20/00* (2019.01); *G08G 5/0013* (2013.01); *G08G 5/003* (2013.01)

(58) Field of Classification Search
CPC ...... G08G 5/006; G08G 5/0013; G08G 5/003; G08G 5/0021; G08G 5/0091; G06N 20/00
See application file for complete search history.

(56) References Cited

U.S. PATENT DOCUMENTS

| | | | | |
|---|---|---|---|---|
| 5,553,387 A | * | 9/1996 | Newcomb ............ | G06G 1/0052 33/431 |
| 6,167,627 B1 | * | 1/2001 | Wilder .................. | G01C 21/20 235/61 NV |
| 7,003,383 B2 | | 2/2006 | Rumbo et al. | |
| 7,370,790 B2 | | 5/2008 | Martincik | |
| 8,700,317 B1 | * | 4/2014 | Wilder .................. | G08G 5/025 701/487 |
| 10,019,905 B1 | * | 7/2018 | Kneuper .............. | G08G 5/0039 |
| 2004/0230351 A1 | * | 11/2004 | Rumbo ................ | G05D 1/0202 701/3 |
| 2006/0012492 A1 | * | 1/2006 | Degidio ............... | G06G 1/0052 340/971 |
| 2006/0020374 A1 | * | 1/2006 | Kenner ................. | G01C 23/00 701/4 |

(Continued)

*Primary Examiner* — Peter D Nolan
*Assistant Examiner* — Peter Y Ning
(74) *Attorney, Agent, or Firm* — Alston & Bird LLP

(57) ABSTRACT

Methods, apparatuses, and computer program products are disclosed for determining a holding pattern. An example method includes receiving an estimated time of clearance and holding pattern instructions for an aircraft chartered for holding, receiving flight information and aircraft state information associated with the aircraft, deriving a holding time estimate from the estimated time of clearance, the flight information and aircraft state information, and computing holding pattern parameters placing the aircraft on a holding inbound segment prior to the estimated time of clearance based at least in part on the holding time estimate. The method further includes transmitting the holding pattern parameters to a computing device.

20 Claims, 10 Drawing Sheets

(56) References Cited

U.S. PATENT DOCUMENTS

| | | | |
|---|---|---|---|
| 2007/0040011 A1* | 2/2007 | Martincik | G01C 21/20 |
| | | | 235/61 NV |
| 2009/0267800 A1* | 10/2009 | Hammack | G01C 23/00 |
| | | | 701/8 |
| 2017/0301246 A1* | 10/2017 | De Prins | G08G 5/0091 |
| 2018/0061243 A1* | 3/2018 | Shloosh | G08G 5/0043 |
| 2018/0286257 A1* | 10/2018 | Schwartz | G08G 5/0091 |
| 2019/0213892 A1* | 7/2019 | Schwindt | B64D 45/00 |
| 2020/0105148 A1* | 4/2020 | DeWeese | B64D 43/00 |
| 2021/0027636 A1* | 1/2021 | Dziecielski | G08G 5/0026 |

* cited by examiner

SYSTEMS AND METHODS FOR OPTIMIZING HOLDING PATTERN MANEUVER IN A CONNECTED ENVIRONMENT

CROSS-REFERENCE TO RELATED APPLICATIONS

This application claims priority pursuant to 35 U.S.C. 119(a) of India Patent Application No. 202041010064, filed Mar. 9, 2020, which application is incorporated herein by reference in its entirety.

TECHNOLOGICAL FIELD

Example embodiments of the present application relate generally to aircraft navigation and, more particularly, to determining an optimum aeronautical holding pattern.

BACKGROUND

Aircraft navigation often requires a pilot's constant consideration of terrain, diligent review of weather conditions, and accurate adherence to approved flight plans. In doing so, pilots rely upon flight aids (e.g., flight management systems and associated sensors) to perform real time calculations and adjust a flight path of the aircraft to ensure safe and efficient travel. For example, pilots may monitor and balance a usage of thrust, pay load, fuel weight, winds, altitude, and velocity.

BRIEF SUMMARY

Systems, apparatuses, methods, and computer program products are disclosed herein for determining a holding pattern. In one embodiment, with reference to the claimed computed implemented method, a method for determining a holding pattern is provided which includes receiving an estimated time of clearance and holding pattern instructions for an aircraft chartered for holding and receiving flight information and aircraft state information associated with the aircraft. The method further includes deriving a holding time estimate from the estimated time of clearance, the flight information and aircraft state information, computing holding pattern parameters placing the aircraft on a holding inbound segment prior to the estimated time of clearance based at least in part on the holding time estimate, and transmitting the holding pattern parameters to a computing device.

In some embodiments, computing holding pattern parameters placing the aircraft on a holding inbound segment prior to the estimated time of clearance based at least in part on the holding time estimate further includes computing hold speed of the aircraft based at least in part on the holding time estimate and the estimated time of clearance and computing a minimum holding entry pattern time and a minimum holding circuit time based at least in part on the hold speed.

In some embodiments, the method further includes, determining whether clearance has been received and in accordance with a determination that clearance has been received, transmitting exit holding pattern instructions, the exit holding pattern instructions preparing for approach and landing segment. In some embodiments, and in accordance with a determination that clearance has not been received, and in accordance with a determination that the estimated time of clearance has elapsed, the method further includes continuing to compute the holding pattern parameters until clearance is received. The flight information comprises at least in part enhanced ground proximity warning system (EGPWS) terrain data, weather data, navigation data from a navigation database, crowd-sourced sensor data, air traffic data, flight information exchange model (FIXM) data, weather information exchange model (WXXM) data, or aeronautical information exchange model (AIXM) data. The aircraft state information comprises at least in part performance data or aircraft data.

In some further embodiments, the method includes calculating a minimum holding time based on a total entry distance at a hold speed and computing the holding pattern parameters based on the minimum holding time.

In some further embodiments, the method also includes analyzing historical data from a historical database to determine the holding pattern and using the historical data to train a machine learning model. In some embodiments, the method further includes receiving from the machine learning model a prediction of the holding pattern.

The above summary is provided merely for purposes of summarizing some example embodiments to provide a basic understanding of some aspects of the application disclosure. Accordingly, it will be appreciated that the above-described embodiments are merely examples and should not be construed to narrow the scope or spirit of the application in any way. It will be appreciated that the scope of the application disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1A:
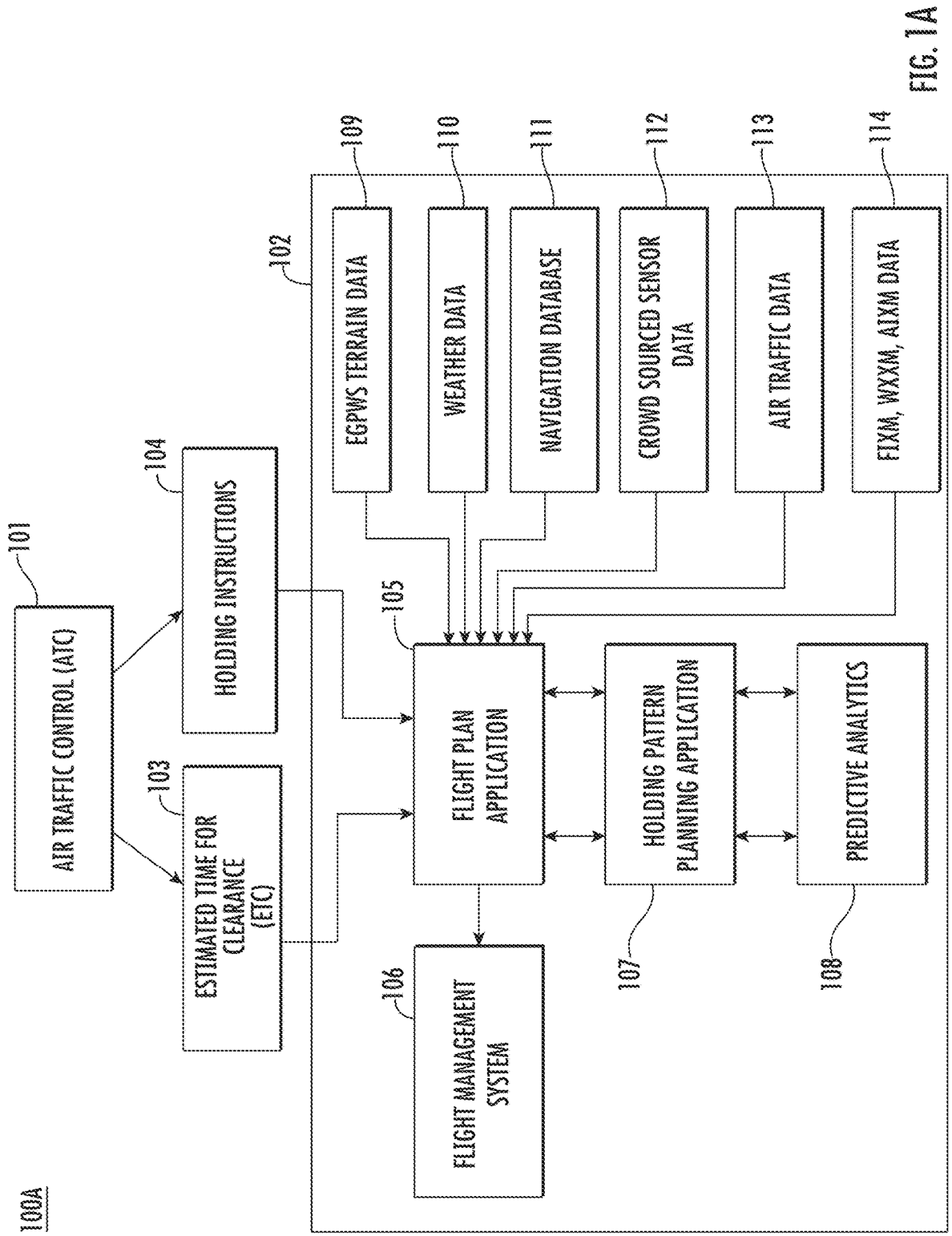
FIGS. 1A and 1B illustrate exemplary systems within which embodiments of the present disclosure may operate.

Some embodiments of the present application will now be described more fully hereinafter with reference to the accompanying drawings, in which some, but not all embodiments of the systems and methods described herein are shown. Indeed, these systems and methods may be embodied in many different forms and should not be construed as limited to the embodiments set forth herein; rather, these embodiments are provided so that this disclosure will satisfy applicable segmental requirements. Like numbers refer to like elements throughout. As used herein, the description refers to a flight management server as an example "apparatus." However, elements of the apparatus described herein may be equally applicable to the claimed method and computer program product. Thus, use of any such terms should not be taken to limit the spirit and scope of embodiments of the present application disclosure.

Definition of Terms

As used herein, the terms "holding pattern parameters," "optimized holding pattern parameters," "holding parameters," and similar terms can refer to any measure that can be used to define a holding pattern maneuver such as, but not limited to, a hold speed of the aircraft, a minimum holding entry pattern time, and a minimum holding circuit time around the holding pattern racetrack given a calculated total holding time and the estimated time of clearance (ETC) and holding instructions received by an air traffic control (ATC) Some of these parameters can be calculated using the calculated total holding time, the ETC and holding instructions. These parameters can generally be used to represent an optimized holding pattern.

As used herein, the terms "data," "content," "information," "electronic information," "signal," "command," and similar terms can be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data can be received directly from the second computing device or can be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data can be sent directly to the second computing device or can be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase can be included in at least one embodiment of the present disclosure. Thus, the particular feature, structure, or characteristic can be included in more than one embodiment of the present disclosure such that these phrases do not necessarily refer to the same embodiment.

As used herein, the word "example" is used to mean "serving as an example, instance, or illustration." Any implementation described herein as "example" is not necessarily to be construed as preferred or advantageous over other implementations.

As used herein, the terms "flight management system," "flight management server," "flight planning aid," and the like can refer to computer hardware and/or computer software that is configured (either physically or by the execution of software) to perform one or more flight holding pattern maneuvers of the present disclosure and, among various other functions, is configured to directly, or indirectly, transmit and receive data. An example flight management server can refer to a computing device/system of an aircraft that can be, in whole or in part, supported by the aircraft during performance of a flight plan (e.g., during flight) and configured to facilitate operation thereof. Said differently, the flight management server can refer to the collection of processors, memories, sensors, dials, gauges, displays, and the like configured to control or facilitate operation of one or more processes of an aircraft. Furthermore, the flight management server can be housed, in some embodiments, entirely by the aircraft, while in other embodiments, the flight management server can include elements located separate from the aircraft. The flight management serve can be configured to communicate with the other computing devices via Bluetooth, NFC, Wi-Fi, 3G, 4G, 5G, Radio-frequency identification (RFID) protocols, and the like.

As used herein, the term "external device" refers to any object, device, or system which can be in network communication with the flight management server. For example, an external device can be an external server or computing device (e.g., associated with an airport, air traffic controller, or the like) that can request, receive, and/or provide data to or from one of the devices described above. By way of example, an external device can include a server associated with an airport that operates to transmit and receive flight plan data, navigation data, or the like to and from the flight management server (e.g., an aircraft).

As used herein, the term "navigation database" refers to a data structure or repository for storing navigation data, flight path data, sensor data, and/or the like. Similarly, the "navigation data" of the navigation database can refer to data generated by or relevant to an aircraft (e.g., velocity data, altitude data, weather data, airport data, or the like). The navigation database can be accessible by one or more software applications of the flight management server.

As used herein, the term "computer-readable medium" refers to non-transitory storage hardware, non-transitory storage device or non-transitory computer system memory that can be accessed by a controller, a microcontroller, a computational system or a module of a computational system to encode thereon computer-executable instructions or software programs. A non-transitory "computer-readable medium" can be accessed by a computational system or a module of a computational system to retrieve and/or execute the computer-executable instructions or software programs encoded on the medium. Exemplary non-transitory computer-readable media can include, but are not limited to, one or more types of hardware memory, non-transitory tangible media (for example, one or more magnetic storage disks, one or more optical disks, one or more Universal Serial Bus (USB) flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Overview

Figure 1B:
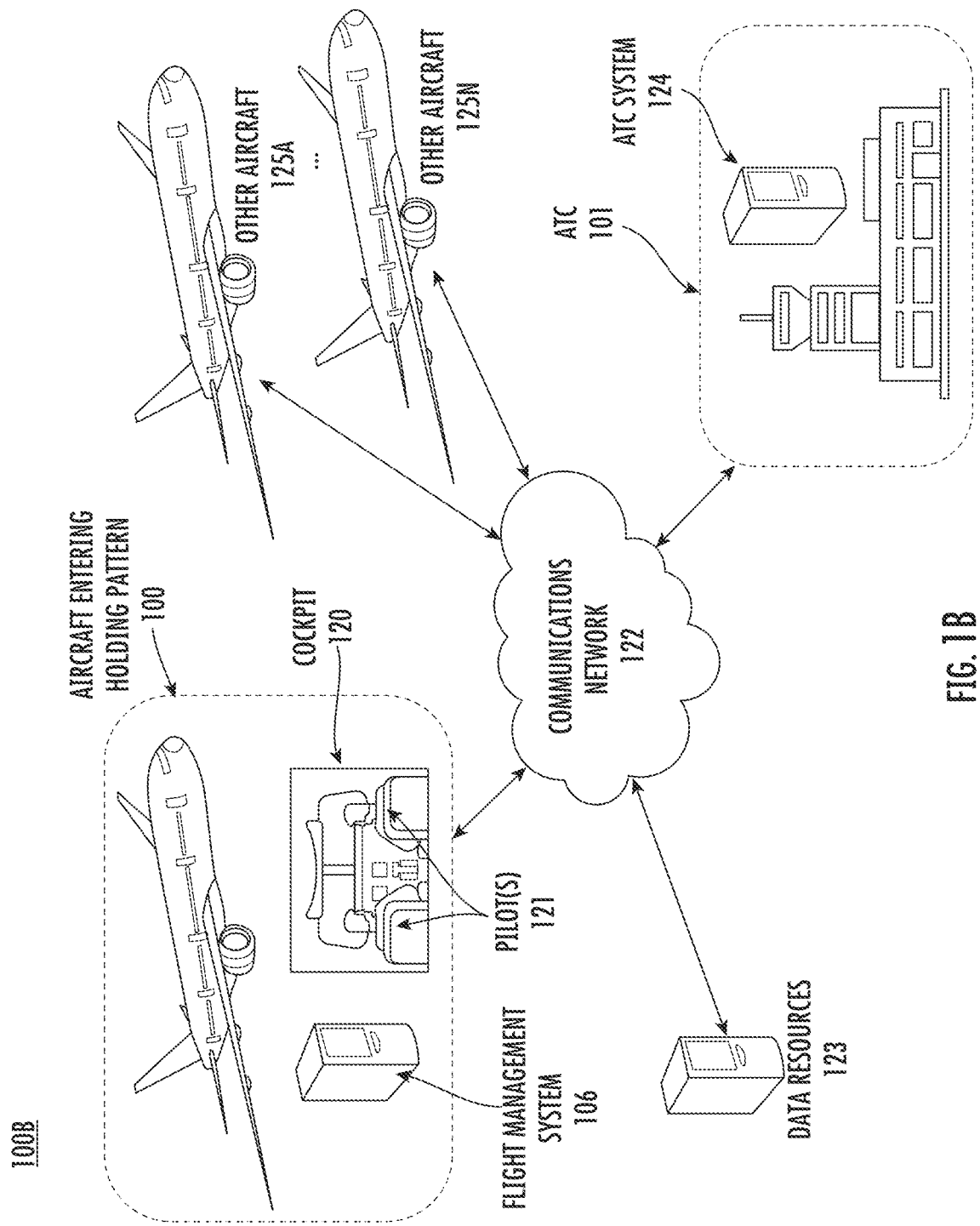

FIGS. 1A and 1B illustrate exemplary systems within which embodiments of the present disclosure operate. In an exemplary embodiment, a systems 100A and 100B comprise a flight management server 102 configured for operation in the cockpit 120 of an aircraft (e.g., aircraft entering holding pattern 100) and for operation by one or more pilots 121.

In an example embodiment, a flight plan application 105 is configured to act as a central control point for pilot 121 interactions. In this regard, a flight plan application 105 initiates the flight plan and engender other systems such as the flight management system 106 and associated aircraft navigation system to execute the flight plan. This includes data communicating with other in-aircraft and out-of-aircraft applications, databases, data processing resources, and other system, as may be required and/or desired in a particular embodiment.

The flight plan application 105 communicates data, voice, and other signals with an air traffic control (ATC) 101 system or device 124. One such communication includes holding pattern instructions 104 and an estimated time of clearance (ETC) 103. In an exemplary embodiment, the ETC 103 is an estimation of time when the pilot(s) 121 expect to receive a clearance beyond a clearance limit. The clearance limit is a fix, a point, or a location to which an aircraft is cleared when issued an air traffic clearance.

By way of example, the holding pattern instructions 104 include a direction of the hold from the fix referencing a cardinal direction (e.g., north, south, northwest, southwest, etc.), an actual holding fix if not already specified, a radial, bearing, course, airway or route to hold on, segment length in miles, direction of turn, and the ETC 103. The holding pattern instructions 104 and the ETC 103 received from the ATC 101 is then transmitted to the holding pattern planning application 107 to compute optimized holding pattern parameters which are described below (e.g., hold speed, minimum holding entry pattern time, minimum hold circuit time, holding inbound time, etc.) to ensure that the aircraft is on a holding inbound segment prior to the estimated time of clearance based at least in part on the holding time estimate.

In some embodiments, the flight plan application 105 communicates the holding pattern instructions 104 and the ETC 103 received from the ATC 101 and data 109-114 with a holding pattern planning application 107. In an exemplary embodiment, the holding pattern planning application 107 comprises a trained holding pattern model that is configured, upon receiving an ETC and holding pattern instructions for an aircraft chartered for holding, to determine optimized holding pattern parameters. The optimized holding pattern parameters are transmitted to a computing device (e.g., apparatus 200) to facilitate execution of the optimized holding pattern.

In another exemplary embodiment, responsive to receiving an ETC and holding pattern instructions, the optimized holding pattern parameters may be determined using a trained holding pattern model, as well as other integrated applications and in-aircraft and out-of-aircraft data sources and data processing resources.

In some embodiments, the trained holding pattern models (e.g., machine-learning based models) are configured to adjust holding pattern parameters and to determine whether each holding pattern parameter value satisfies the received ETC and holding pattern instruction conditions to be transmitted to the flight management system 106. Such holding pattern parameter data may be analyzed, for example via one or more machine-learning based models, to determine whether parameters are similar to parameters specified by other aircrafts having similar characteristics and/or environmental factors so as to determine whether such parameters are deemed optimal to a particular ETC and holding pattern instruction. Based on analysis of the prior holding pattern parameters, the holding pattern planning application 107 may be configured to generate a proposed adjusted set of holding pattern parameters to be implemented on behalf of the aircraft.

The flight plan application 105 communicates with a plurality of in-aircraft and remote out-of-aircraft data resources 123 (i.e., as local repositories or as remote resources from which data is received via a communications network 122). In this regard, such data resources 123 include at least one of enhanced ground proximity warning system (EGPWS) terrain data 109, weather data 110, navigation data from a navigation database 111, crowd sourced sensor data 112, air traffic data 113, and/or flight information exchange model (FIXM) data, weather information exchange model (WXXM) data, or aeronautical information exchange model (AIXM) data 114 (i.e., FIXM, WXXM, AIXM data 114).

Such data resources 123 may be used by predictive analytics component 108. The predictive analytics component 108 communicates with the holding pattern planning application 107. The predictive analytics component 108 data processes FIXM, WXXM, AIXM data 114 and other data to establish relationships between two or more of the data elements.

In an exemplary embodiment, the predictive analytics component 108 may develop the algorithms and statistical models needed to perform specific tasks and determine an optimized holding pattern comprising optimized holding pattern parameters relying on patterns and inferences. In embodiments, the predictive analytics component 108 is configured to assist the trained holding pattern model in accomplishing operations described herein.

The flight plan application 105 may also access or otherwise communicate with crowd sourced sensor data 112. In an exemplary embodiment such crowd sourced sensor data 112 may be data collected from aircraft 100, as well as other aircraft 125A-125N in the area. Such data is useful in understanding where air turbulence is present, as well as atmospheric conditions, and for forming other data insights, as may be required and/or desired in a particular embodiment. This data may be useful in determining the optimized holding pattern parameters and ultimately generating or selecting an optimized holding pattern based on the optimized holding pattern parameters.

As illustrated in FIG. 1B aircraft 100 and the other aircrafts 125A-125N are part of a connected aircraft environment. It will be appreciated that data is sent directly to aircraft 100 or may be sent indirectly via one or more intermediary computing devices, such as, for example, a cloud-based server (e.g., cloud utilities). The flight management system 106 further includes mobile applications comprising flight services including: flight planning, real-time datalink of ATC approved flight plans to the aircraft, cabin services, flight concierge services, fuel planning, flight plan filing, plan approval, and need based access to databases and/or technical publications. Such services provide by the flight management system 106 may improve flight operations, enhance safety and reduce costs. Additionally, the flight management system 106 and the holding pattern planning application 107 is configured to perform real-time analysis and provide the pilot(s) 121 with the most optimal holding parameters to use.

Device Architecture and Example Apparatus

Figure 2:
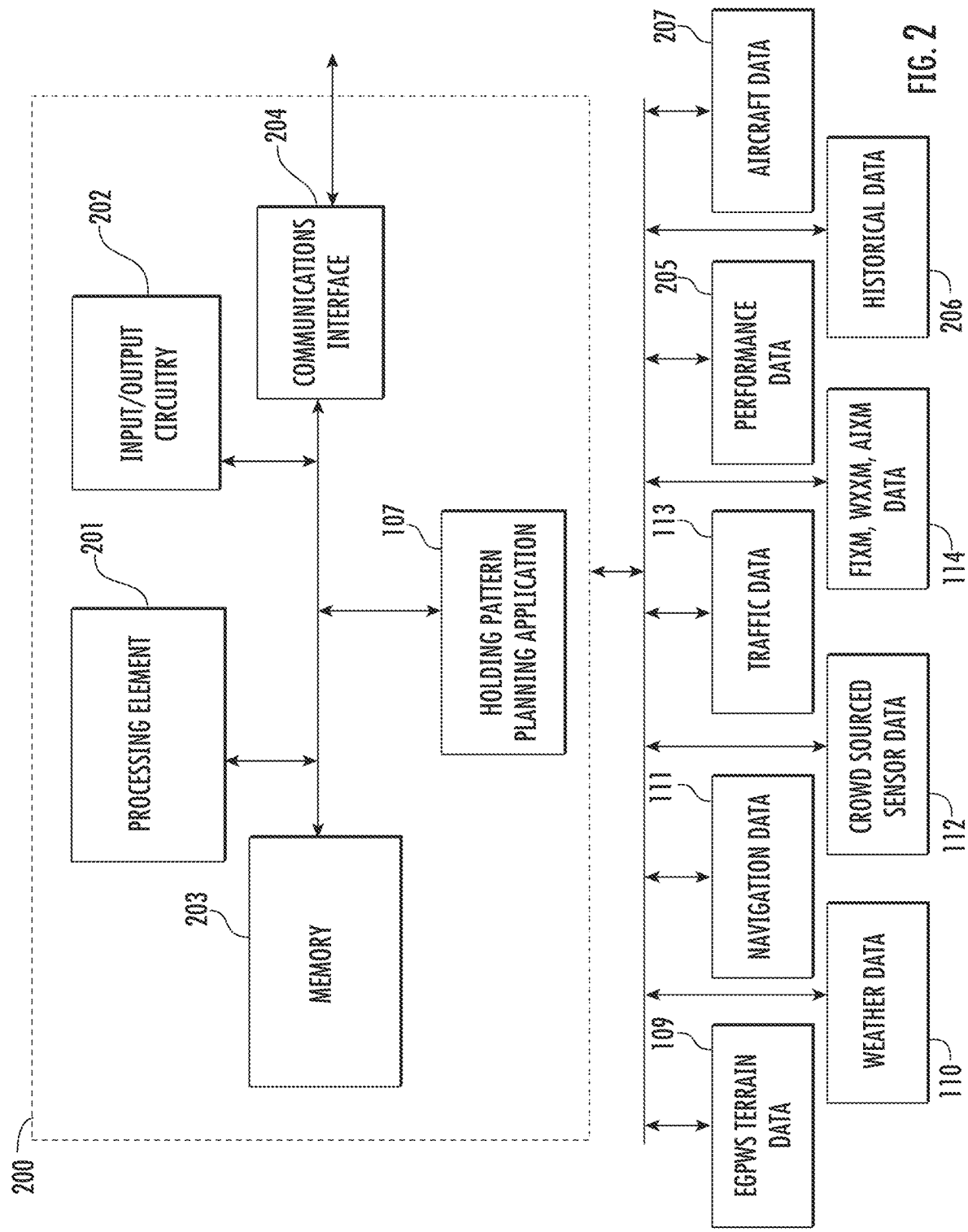
FIG. 2 illustrates an exemplary apparatus for use with embodiments of the present disclosure.

Each flight management server 102 may be embodied by one or more computing systems, such as apparatus 200 shown in FIG. 2. The apparatus 200 includes processing element 201, memory 203, input/output circuitry 202, communications interface 204, and holding pattern planning application 107. The apparatus 200 is configured to execute the operations described herein. Although these components are described with respect to functional limitations, it should be understood that the particular implementations necessarily include the use of particular hardware. It should also be understood that certain of these components can include similar or common hardware. For example, two sets of circuitries can both leverage use of the same processor, network interface, storage medium, or the like to perform their associated functions, such that duplicate hardware is not required for each set of circuitries.

In some embodiments, the processing element or processing element 201 (and/or co-processor or any other processing circuitry assisting or otherwise associated with the processor) is in communication with the memory 203 via a bus for passing information among components of the apparatus. The memory 203 is non-transitory and includes, for example, one or more volatile and/or non-volatile memories. In other words, for example, the memory 203 may be an electronic storage device (e.g., a computer-readable storage medium). The memory 203 may be configured to store information, data, content, applications, instructions, or the like for enabling the apparatus to carry out various functions in accordance with example embodiments disclosed herein.

The processing element 201 may be embodied in a number of different ways and can, for example, include one or more processing devices configured to perform independently. In some preferred and non-limiting embodiments, the processing element 201 includes one or more processors configured in tandem via a bus to enable independent execution of instructions, pipelining, and/or multithreading. The use of the term "processing circuitry" can be understood to include a single core processor, a multi-core processor, multiple processors internal to the apparatus, and/or remote or "cloud" processors.

In some preferred and non-limiting embodiments, the processing element 201 is configured to execute instructions stored in the memory 203 or otherwise accessible to the processing element 201. In some preferred and non-limiting embodiments, the processing element 201 is configured to execute hard-coded functionalities. As such, whether configured by hardware or software methods, or by a combination thereof, the processing element 201 may represent an entity (e.g., physically embodied in circuitry) capable of performing operations according to an embodiment while configured accordingly. Alternatively, as another example, when the processing element 201 is embodied as an executor of software instructions, the instructions specifically configure the processing element 201 to perform the algorithms and/or operations described herein when the instructions are executed.

In some embodiments, the apparatus 200 includes input/output circuitry 202 that may, in turn, be in communication with processing element 201 to provide output to the user and, in some embodiments, to receive an indication of a user input. The input/output circuitry 202 may comprise a user interface and may include a display, and may comprise a web user interface, a mobile application, a client device, a kiosk, or the like. In some embodiments, the input/output circuitry 202 may also include a keyboard, a mouse, a joystick, a touch screen, touch areas, soft keys, a microphone, a speaker, or other input/output mechanisms appropriate for use within an aircraft. The processor and/or user interface circuitry comprising the processor can be configured to control one or more functions of one or more user interface elements through computer program instructions (e.g., software and/or firmware) stored on a memory accessible to the processor (e.g., memory 203, and/or the like).

The communications interface 204 is configured as any means such as a device or circuitry embodied in either hardware or a combination of hardware and software that is configured to receive and/or transmit data from/to a network and/or any other device, circuitry, or module in communication with the apparatus 200. In this regard, the communications interface 204 includes, for example, a network interface for enabling communications with a wired or wireless communication network. For example, the communications interface 204 may include one or more network interface cards, antennae, buses, switches, routers, modems, and supporting hardware and/or software, or any other device suitable for enabling communications via a network. Additionally, or alternatively, the communications interface 204 may include the circuitry for interacting with the antenna/antennae to cause transmission of signals via the antenna/antennae or to handle receipt of signals received via the antenna/antennae.

Holding pattern planning application 107 includes hardware configured to receive holding pattern instructions 104 and an ETC 103 from the ATC 101, and generate an optimized holding pattern. The holding pattern planning application 107 utilizes processing circuitry, such as the processing element 201, to perform these actions. However, it should also be appreciated that, in some embodiments, the Holding pattern planning application 107 may include a separate processor, specially configured Field Programmable Gate Array (FPGA), or Application Specific Integrated Circuit (ASIC) for performing the functions described herein. The holding pattern planning application 107 may be implemented using hardware components of the apparatus configured by either hardware or software for implementing these planned functions.

In some embodiments, apparatus 200 further includes navigation circuitry (not shown) which includes hardware configured to receive and distribute location coordinates and utilize location coordinates for navigation of aircraft 100. The navigation circuitry utilizes processing circuitry, such as the processing element 201, to perform these actions. However, it should also be appreciated that, in some embodiments, the navigation circuitry may include a separate processor, specially configured Field Programmable Gate Array (FPGA), or Application Specific Integrated Circuit (ASIC) for performing the functions described herein. The navigation circuitry may be implemented using hardware components of the apparatus configured by either hardware or software for implementing these planned functions.

It is also noted that all or some of the information discussed herein may be based on data that is received, generated and/or maintained by one or more components of apparatus 200. In some embodiments, one or more external systems (such as a remote cloud computing and/or data storage system) can also be leveraged to provide at least some of the functionality discussed herein.

The apparatus 200 communicates with a plurality of in-aircraft and remote out-of-aircraft data processing resources including at least one of enhanced ground proximity warning system (EGPWS) terrain data 109, weather data 110, navigation data from navigation database 111, crowd sourced sensor data 112, air traffic data 113, performance data 205, flight information exchange model (FIXM) data, weather information exchange model (WXXM) data, or aeronautical information exchange model (AIXM) data 114 (i.e., FIXM, WXXM, AIXM data 114), performance data 205, historical data 206, and aircraft data 207.

Example Operations for Determination of an Optimized Holding Pattern

During any part of a flight a pilot is subject to receiving instructions from ATC 101 to enter a holding pattern. Holding patterns are maneuvers an aircraft takes before landing and are used to prevent accidents from occurring. Flying a holding pattern includes maneuvers to enter the holding pattern racetrack, holding in the racetrack and maneuvers to exit the racetrack. In some cases, incoming aircrafts may be queued or stacked due to runway traffic, poor weather, or runway unavailability. Holding Patterns are used to keep aircrafts separated from each other for a variety of safety reasons. Once an aircraft receives a holding pattern instruction from ATC, the aircraft must enter the holding pattern using one of different types of entry methods, such methods are described below. It may be difficult for new pilots and experienced pilots to determine the correct holding pattern entry because of the complex calculations involved for entering holding patterns precisely. Once in a holding pattern, the aircraft must stay in hold as long as needed until receiving a clearance to land (e.g., "exit hold") from ATC.

Figure 3:
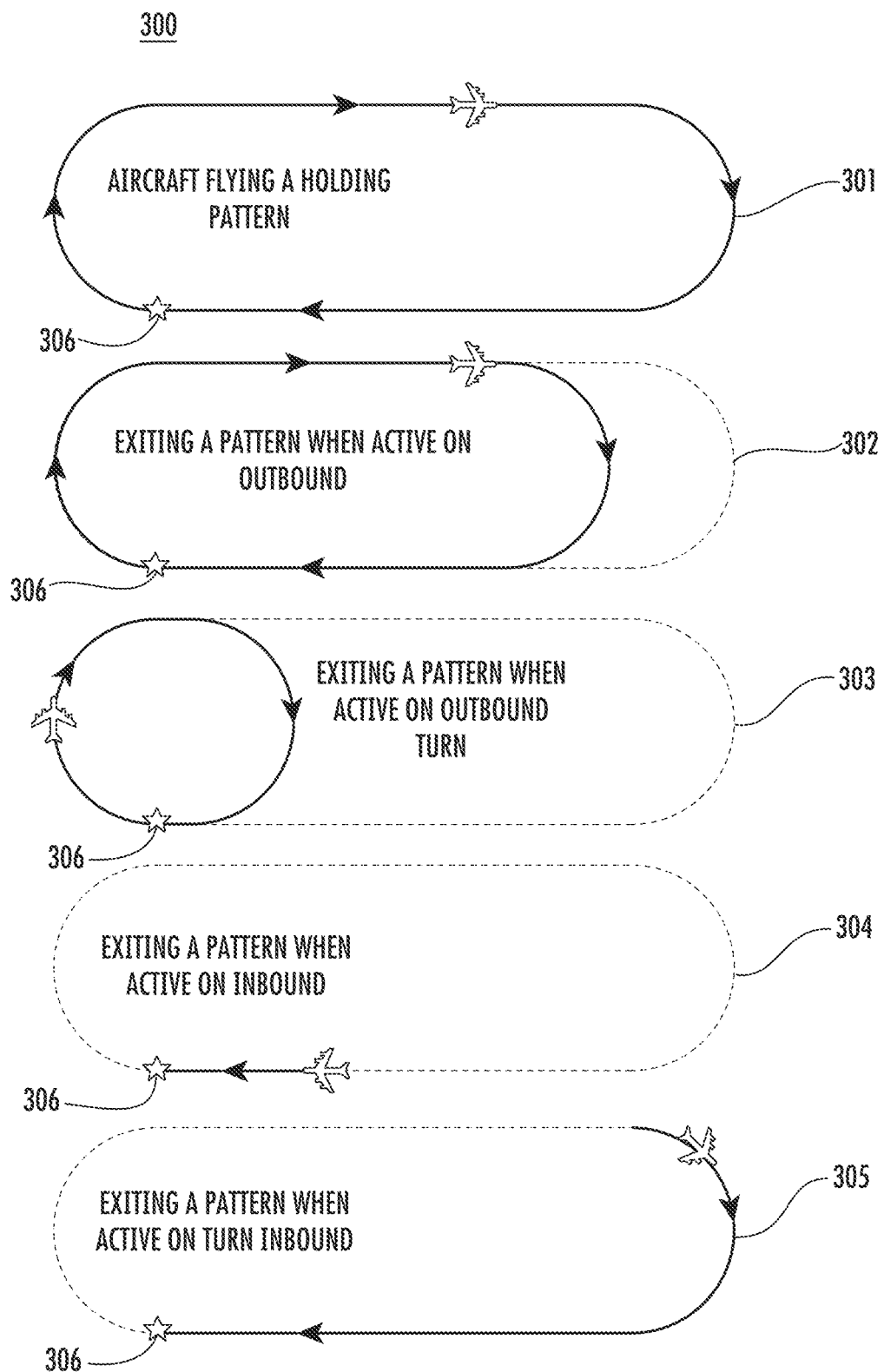
FIG. 3 illustrates exemplary operations for an aircraft exiting a holding pattern, according to embodiments of the present disclosure.

With reference to FIG. 3, an example aircraft traveling along a holding pattern 301 such as a holding pattern racetrack is illustrated for implementing one or more optimized holding pattern maneuvers described herein. According to the Federal Aviation Administration (FAA), a holding pattern racetrack involves two turns and two segments, used to keep an aircraft within a prescribed airspace with respect to a geographic fix (e.g., holding fix). As shown by 300, when the ATC 101 is ready for the aircraft to exit the hold, the ATC 101 will issue a clearance to the aircraft's destination. In this case, the aircraft exits the holding pattern when active on outbound 302. The aircraft may exit the holding pattern when active on an outbound turn 303, exit the holding pattern when active on inbound, or exit the holding pattern when active on an inbound turn 305. As shown by FIG. 3, even though the ATC 101 directs traffic for a specific period of holding time, the overall time entering, flying and exiting a holding pattern performed by an aircraft is inaccurate and typically consumes additional time than initially directed by the ATC. The overall actual time spent in a holding entry, holding, and holding exit ends up, in some examples, to be very different than the ATC 101 directed holding times. Moreover, such inaccuracies can be amplified with external factors of weather (e.g., wind), traffic, and airport conditions contributing to the holding time. Depending on the relative location of the airplane in the holding pattern (e.g., on the holding pattern racetrack), the aircraft may take a few seconds to few minutes to exit the holding pattern as depicted by the different maneuvers executed by an aircraft to exit a holding pattern shown in FIG. 3. In this case, establishing the aircraft on the inbound segment as illustrated by 304 is preferred as the aircraft will consume a substantially short time (e.g., a few seconds) to exit the holding pattern. As such, systems and methods described herein provide for intelligently determining an optimized holding pattern using optimized holding pattern parameters (e.g., hold speed of the aircraft, minimum holding entry pattern time, and minimum holding circuit time around the holding pattern racetrack) such that when clearance to exit the holding pattern is received by ATC, the aircraft is positioned on the inbound segment so as to consume a substantially short time to exit the holding pattern. That is, the systems and methods described herein are configured to plot and/or otherwise determine a holding pattern with an adjusted inbound segment time and distance/length such that the aircraft is on the inbound segment and arrives at the fix point at the ETC. In this way, the holding pattern in executed around a specific fix point.

Figure 4:
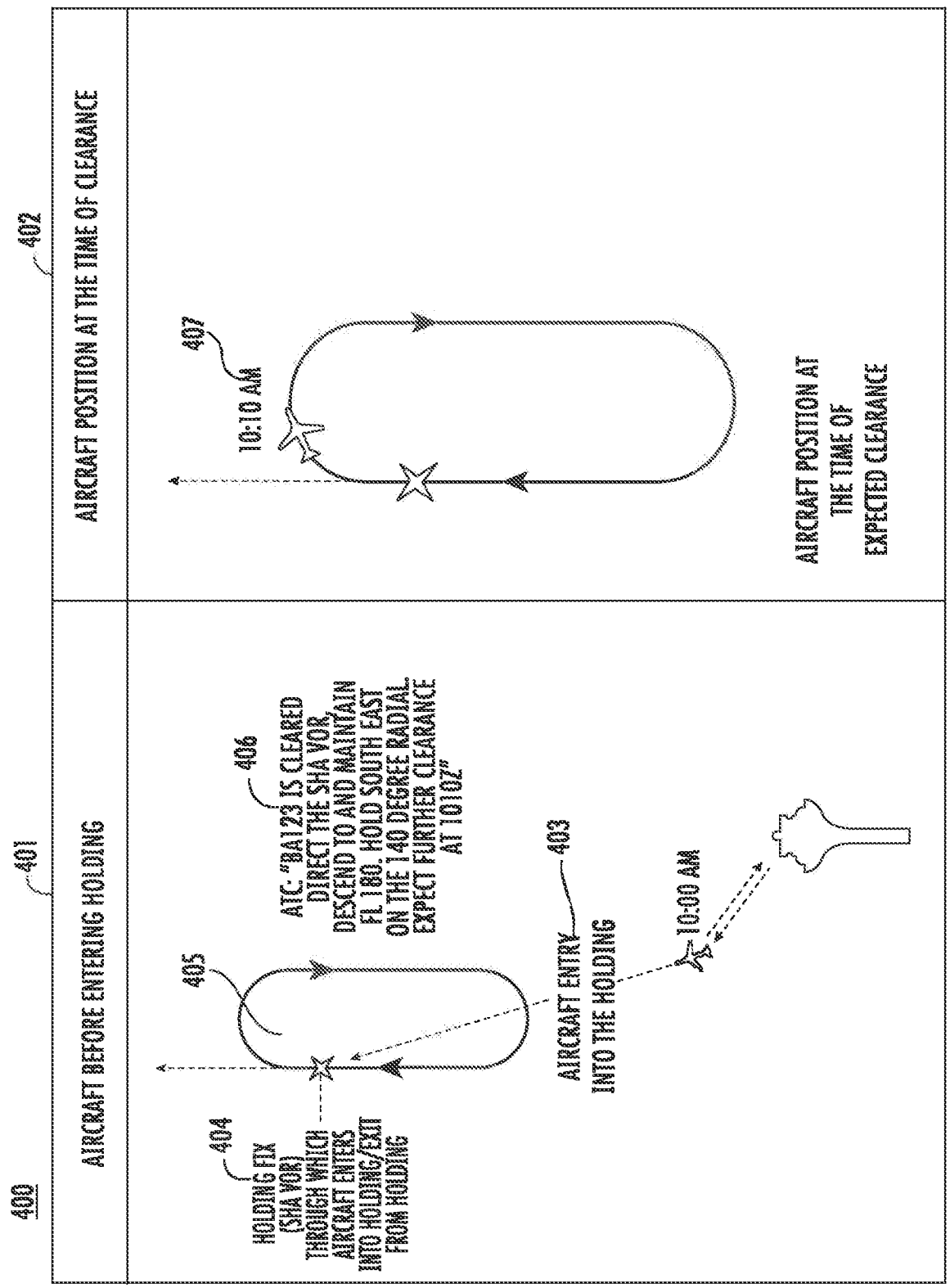
FIG. 4 illustrates exemplary operations for an aircraft entering a holding pattern and an aircraft's position at the time of clearance, according to embodiments of the present disclosure.

In some embodiments the flight management system 106 provides the pilot with information on when and how to exit the holding pattern. Historically the FAA requires that the aircraft pass through fix point 306 on entering and exiting a holding pattern and that it enter within certain angles and exit along a certain path as illustrated in FIG. 3. This has the disadvantage that if the aircraft, for example, is on turn-one as shown in FIG. 4 when the clearance to exit the holding pattern is received from the ATC, the aircraft must still fly the entire segment back to the fix point 306 before it can exit the holding pattern. In this case, time and fuel is wasted.

In an example scenario illustrated in FIG. 4 where an aircraft is about to enter a holding pattern 401, the ATC 101 directs the aircraft, in this example BA123, to holding fix SHA VOR 404 with further instructions to descend and maintain FL180, hold South East on the 140-degree radial and expect further clearance at 1010Z as depicted by 406.

In response to the ATC instructions, the aircraft enters into the holding without any proper calculation of where the aircraft will be by the time of expected clearance and unaware of the real-time situation at the airport waiting for the ATC's clearance as depicted by 403. As shown by 405, holding fix SHA VOR 404 is the waypoint in which the aircraft enters into the holding pattern and exits the holding pattern.

In an instance when the ATC 101 gives the clearance, 402 illustrates the position of the aircraft at the time of clearance. In this case, the aircraft position at the time of clearance 407 is not near the exit fix and there is no guidance provided to the pilot of the aircraft to guide the aircraft in coordination with the ATC.

As shown by 402, the aircraft crosses the exit fix and, thus, in this example, the aircraft needs to complete the remaining holding path before exiting for landing. This extended holding time leads, in some examples, to additional travel time and fuel consumption which could range to several minutes.

As depicted in FIG. 4, the overall time spent by an aircraft in the holding pattern depends on the aircraft course into holding fix, the holding course and the estimated aircraft position at exit. In an example embodiment, if the ATC 101 requires the aircraft to be delayed for 15 minutes, then the aircraft should be in the holding pattern for the required amount of time.

To solve these issues and others, example implementations of embodiments of the system and methods disclosed herein increase pilot efficiency and perform accurate holding parameters estimation for an optimized holding pattern by leveraging at least in part the Required Navigation Performance (RNP) holding patterns (i.e., DO236B Minimum Aviation System Performance Standard (MASPS) standards) to adjust (e.g., shorten, lengthen, increase, or decrease) the inbound segment time and/or distance/length such that the aircraft is positioned or enters the holding pattern along the inbound segment through the fix point at the ETC. The optimized holding pattern parameters computed to establish the aircraft on the inbound segment prior to the ETC includes at least in part a hold speed of the aircraft, a minimum holding entry pattern time, and a minimum holding circuit time around the holding pattern racetrack given a calculated total holding time and the ETC and holding instructions received by ATC.

In some embodiments, when the aircraft is directed for holding and/or the aircraft approaches a holding pattern, the flight management system 106 determines the inbound delta which provides the angle of entry into the holding pattern. The inbound delta is based on the position of the aircraft along a current flight plan segment prior to the holding pattern entry. In some embodiments the inbound delta is calculated using the following equation: (INBOUND_DELTA=normalize [('Aircraft Course into the Holding Waypoint'−180 degrees−'Holding Course')). Thus, the inbound delta may be calculated as a function of the holding pattern course and the course leading the aircraft into the holding pattern.

Figure 5A:
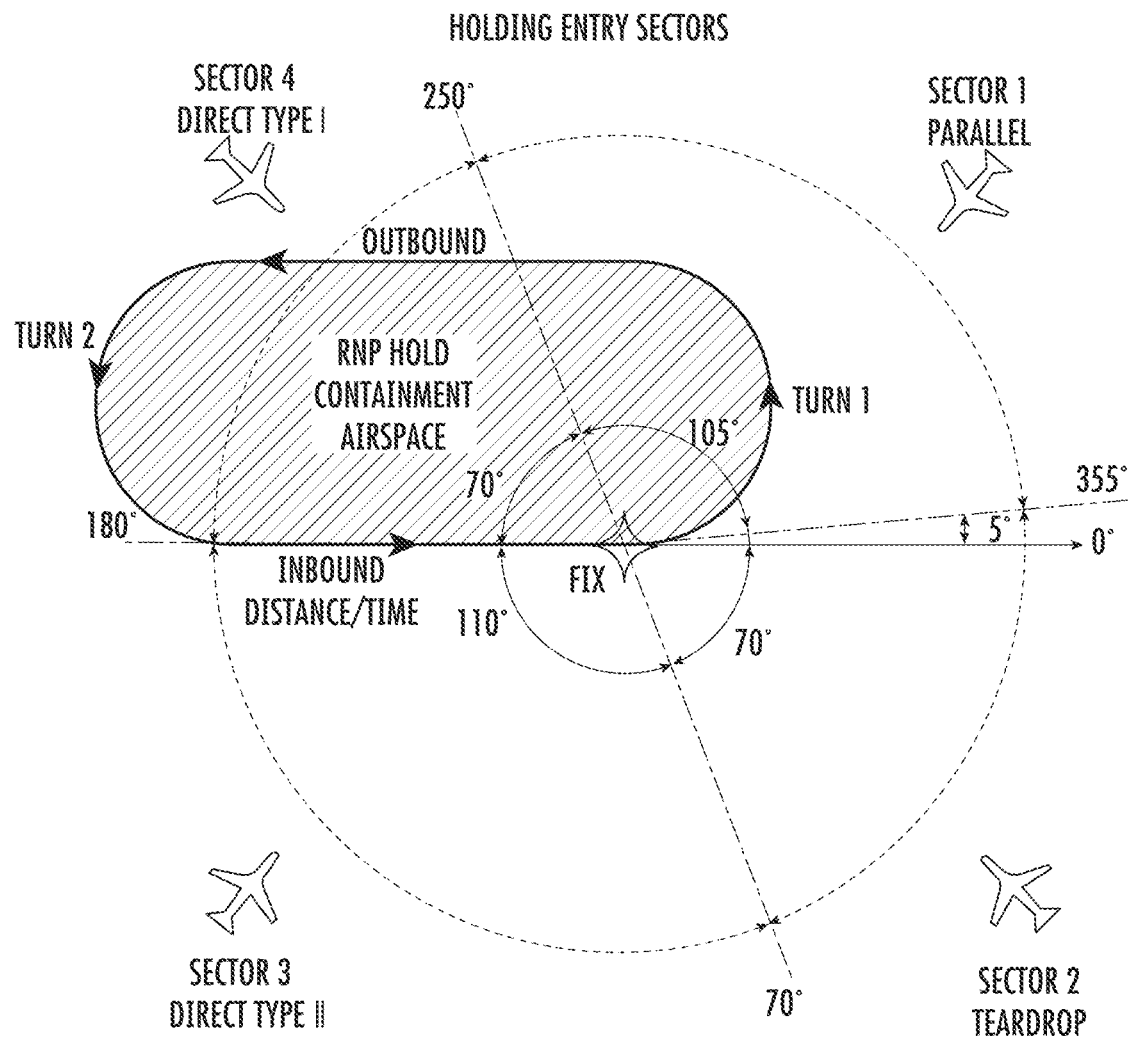
FIGS. 5A and 5B are schematic diagrams illustrating holding pattern entry types, procedures and transitions, according to embodiments of the present disclosure.

The flight management system 106 then determines the holding pattern entry type based on the inbound delta. In holding patterns, there are four types of holding pattern entries: Direct Type I, Parallel, Direct Type II, and Tear Drop, with each of the holding pattern entry types covering various values of inbound deltas. FIG. 5A illustrates the types of holding pattern entries. For example, Direct Type I holding pattern entry type comprises aircraft entries occurring in the 70 degree area of sector 4. The Parallel holding entry type comprises aircraft entries that occur in the 105 degree area of sector 1. The Direct Type II holding pattern entry type comprises aircraft entries that occur in the 110 degree area of sector 3. Lastly, the Tear Drop holding pattern entry type comprises aircraft entries that occur in the 70 degree area of sector 2.

Once the flight management system 106 determines the holding pattern entry type, the flight management system 106 transmits the holding pattern to the holding pattern planning application 107 via the flight plan application 105. The holding pattern planning application 107 will then compute the minimum holding entry pattern time and the minimum hold circuit time. The minimum holding entry pattern time is the minimum amount of time required to put the aircraft on a specified course at a specified waypoint (e.g., holding waypoint or holding fix). This minimum time required to put the aircraft on a specified course at a specified waypoint is a function of the best hold speed flown by the aircraft and the holding pattern entry type that needs to be executed to put the aircraft on the desired course.

The holding pattern planning application 107 will then compute the minimum hold circuit time which is a minimum time the aircraft traverses the holding pattern. The total distance flown for each particular holding pattern entry type at a given best hold speed is computed by the holding pattern planning application 107 as a sum of the segment distances of the composing segments. The time required to fly this travel distance at the given best hold speed defines the minimum holding time (e.g., minimum hold circuit time). The minimum holding time (MINIMUM_HOLDING_TIME) is then be defined as TOTAL_ENTRY_DISTANCE/BEST_HOLD_SPEED.

With continued reference to FIG. 5A, for a Direct Type 1 Entry, the total entry distance is calculated from the following formula:

TOTAL_ENTRY_DISTANCE=
(TURN_1_SEGMENT DISTANCE+OUTBOUND_SEGMENT DISTANCE+
TURN_2_SEGMENT DISTANCE+
INBOUND_SEGMENT DISTANCE).

For a Direct Type 2 Entry, the total entry distance is calculated from the following formula:

TOTAL_ENTRY_DISTANCE=(INITIAL_STRAIGHT DISTANCE+TURN_1_SEGMENT DISTANCE+OUTBOUND_SEGMENT DISTANCE+TURN_2_SEGMENT DISTANCE+
INBOUND_SEGMENT DISTANCE).

For a Teardrop Entry, the total entry distance is calculated from the following formula:

TOTAL_ENTRY_DISTANCE=
(TURN_1_SEGMENT DISTANCE+OUTBOUND_SEGMENT DISTANCE+
TURN_2_SEGMENT DISTANCE+
INBOUND_SEGMENT DISTANCE).

For a Parallel Entry, the total entry distance is calculated from the following formula:

TOTAL_ENTRY_DISTANCE=
(TURN_1_SEGMENT DISTANCE+OUTBOUND_SEGMENT DISTANCE+
TURN_2_SEGMENT DISTANCE+
INBOUND_SEGMENT DISTANCE+
TURN_3_SEGMENT DISTANCE).

Given the computed minimum holding entry pattern time and the minimum hold circuit time, the holding pattern planning application 107 is then configured to adjust the holding inbound length/time such that the aircraft reaches the exit fix or waypoint of the holding pattern by the time of the adjusted ETC from the ATC. In some embodiments, adjusting the holding inbound length/time such that the aircraft reaches the exit fix or waypoint of the holding pattern by the time of the ETC from the ATC includes adjusting the length of the straight portion of one more orbits (e.g., holding inbound segment) in the holding pattern racetrack so that the aircraft leaves the holding pattern at the ETC (e.g., shorten the orbit to exit the holding pattern at the ETC). The holding pattern planning application 107 determines an amount of time by which to adjust the holding inbound segment by determining a difference between the minimum hold circuit time (e.g., time to complete the current holding pattern orbit) and the ETC.

In another example embodiment, system and methods disclosed herein consider the connected aircraft environment and develops analytical models based on environmental factors, traffic, weather conditions, and airport runway conditions to intelligently derive the ETC and provide suggestions for holding speed to be followed by the pilot through an intuitive display of a computing device as described in further detail below.

In yet another example embodiment, the systems and methods described herein intelligently derive the ETC and implement an optimized holding pattern strategy utilizing the information from the connected aircraft environment by obtaining real-time information about nearby traffic, prevailing weather, airport and runway surface conditions and based on the ATC indicated estimated clearance time, the system and methods disclosed herein perform predictive analytics of the expected holding time to implement an accurate holding strategy such that the aircraft exits the holding pattern at the exact time of clearance for approach and landing.

In some examples and when the pilot receives ATC clearance specifying the time of exit or departure from the holding fix, adjustments should be made to the holding pattern parameters within the limits of the established holding pattern to leave the holding pattern as close as possible to the time specified (e.g., ETC). As will be presently explained, to implement an optimized holding strategy such that the aircraft exits the holding pattern at the ETC for exiting the holding pattern, the system and methods disclosed herein consider at least the following holding pattern parameters: the total hold time, the best hold speed, a minimum entry pattern time, and a minimum hold circuit time.

Figure 5B:
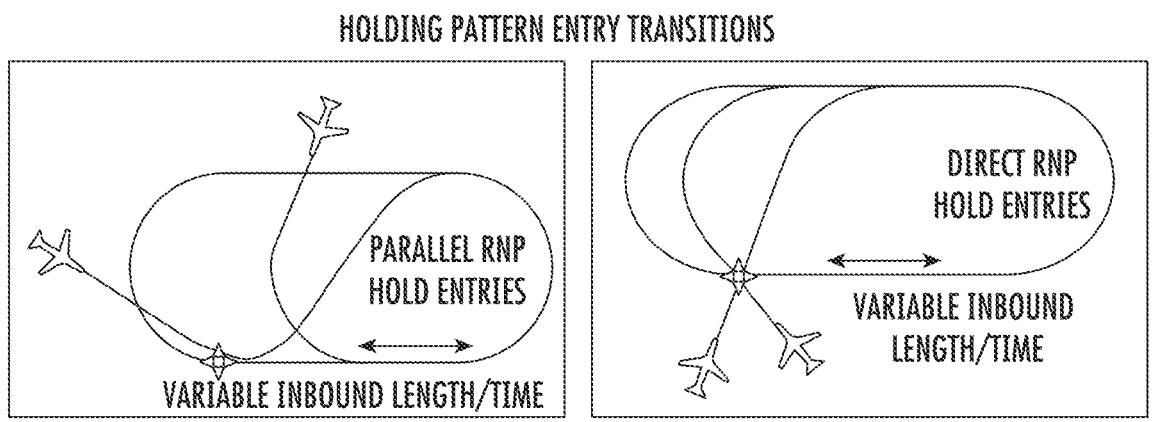

As shown in FIG. 5B, a holding pattern racetrack at the holding pattern fix defines the minimum increments of time that can be flown in the holding pattern (MINIMUM_INCREMENT_TIME=2π×RACETRACK_RADIUS/BEST_HOLD_SPEED). Typically, a holding pattern racetrack is used and defines the most optimal holding procedure as it consumes less airspace. However, the holding pattern racetrack may be extended to form a rectangular structure with non-zero inbound and outbound segment lengths. In some embodiments, any additional holding time required may be split into multiple holding pattern racetrack procedures executed at the holding pattern fix. Based on the available airspace and holding time constraints, an optimal holding pattern procedure is computed with deterministic holding pattern racetrack times.

Figure 6A:
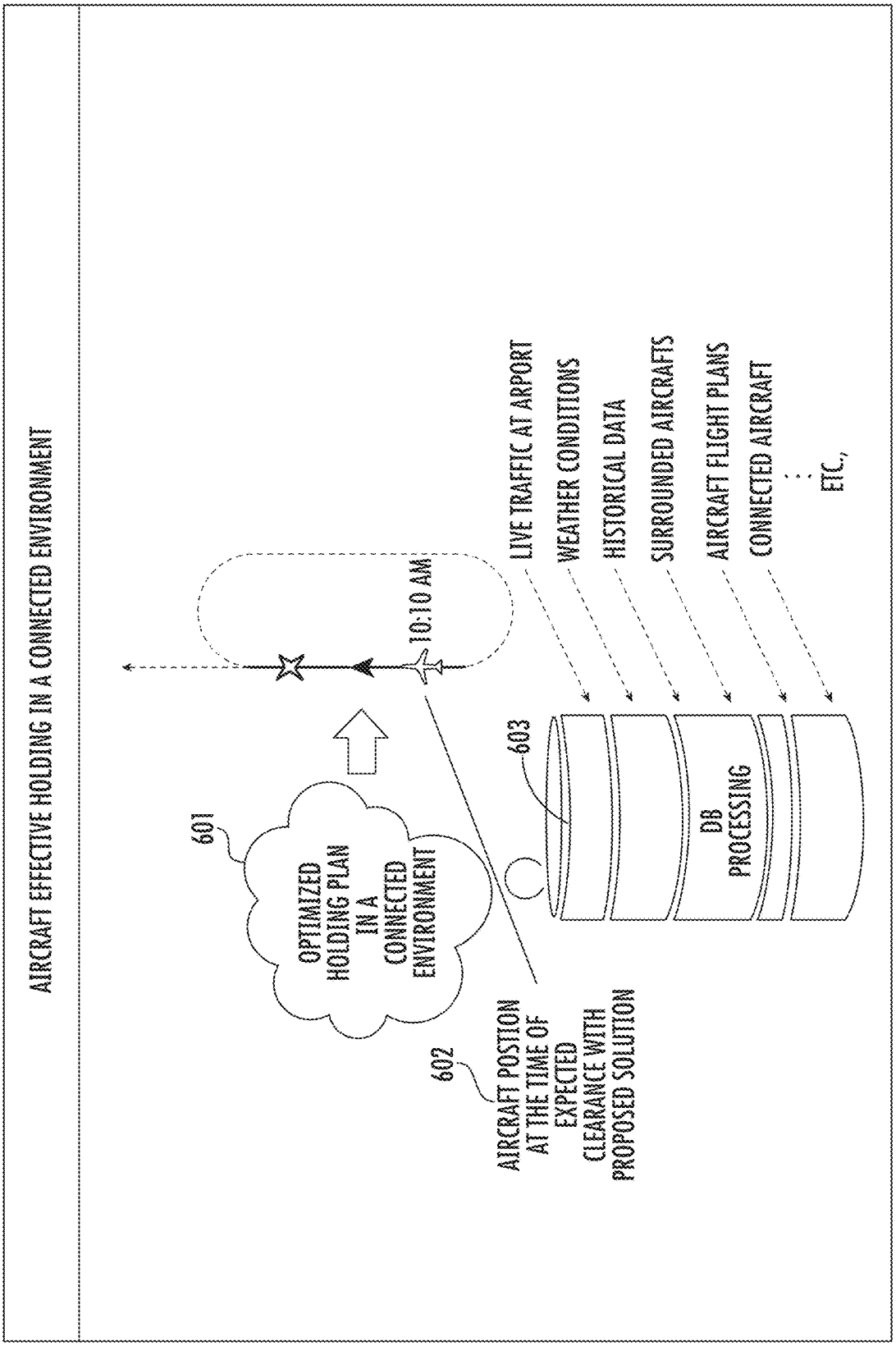
FIG. 6A illustrates exemplary operations for an aircraft within an effective holding pattern in a connected environment, according to embodiments of the present disclosure.

FIG. 6A illustrates an example representation of the features of the flight management server 102. Given, the example scenario described with reference to FIG. 4, the ATC 101 directs the aircraft BA123 to holding fix SHA VOR 404 with further instructions to descend and maintain FL180, hold South East on the 140-degree radial and expect further clearance at 1010Z as depicted by 406.

In response to the ATC instructions, the present systems and methods described herein obtain all the real-time information about the nearby aircrafts, traffic congestion at the airport, the availability of runway and current weather conditions at the airport 603. Based on the ETC, the present systems and methods described herein will compute the holding pattern parameters such that the aircraft is established on the holding inbound segment just prior to the estimated clearance time 601. As shown by 602, at the estimated clearance time, the aircraft directly goes for landing without any need for additional round of holding after the clearance from ATC.

Figure 6B:
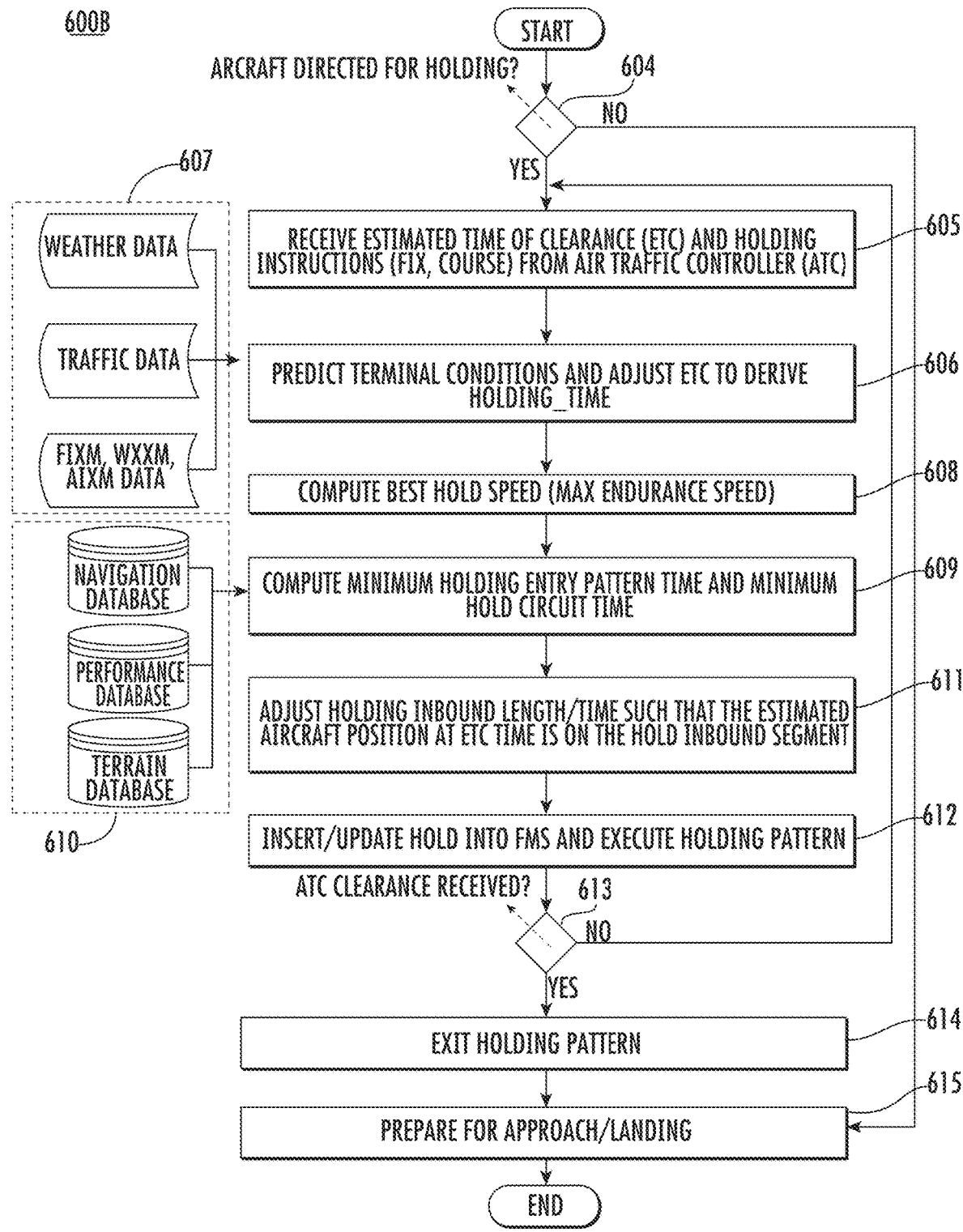
FIG. 6B illustrates an example flowchart, in accordance with some example embodiments described herein.

Turning next to FIG. 6B, a flowchart is shown for optimizing a holding pattern maneuver in a connected environment. The operations illustrated in FIG. 6B are, for example, performed by, with the assistance of, and/or under the control of an apparatus (e.g., flight management server 102), as described above. In this regard, performance of the operations invoke one or more of processing element 201, memory 203, communications interface 204, input/output circuitry 202, and/or holding pattern planning application 107.

As shown in operation 604, the apparatus (e.g., flight management server 102) includes means, such as processing element 201, holding pattern planning application 107, or the like for determining whether the aircraft is directed for holding. At many busy airports across the world, holding is a common phenomenon. Aircrafts typically burn approximately a gallon of fuel every second. ATCs often put aircraft into holding patterns as a technique to sequence terminal area traffic. When a holding is required, it is generally flown in a holding pattern racetrack composed of 2 straight segments in opposite directions with 180 degree turns of the same turn direction bridging their end points as show in FIG. 3. Once, directed by the ATC, a holding pattern is inserted into the flight plan at the designated waypoint/fix by the pilot through a user interface configured by the flight management server 102. Once inserted into the flight plan, holds are flown in autopilot mode typically at max endurance speeds.

If the outcome of operation 604 is a "NO" determination, the apparatus (e.g., flight management server 102) includes means, such as processing element 201, holding pattern planning application 107, or the like for facilitating the aircraft for approach and landing.

If the outcome of operation 604 is a "YES" determination, the apparatus (e.g., flight management server 102) includes means, such as processing element 201, holding pattern planning application 107, or the like for receiving estimated time of clearance (ETC) and holding instructions (Fix, Course) from ATC 101 as shown by operation 605. In an example embodiment, the holding pattern instructions comprises at least the following data: a clearance to the holding fix, a direction to hold from the holding fix, a specified radial, course, or inbound track, an altitude or flight level to be maintained, and the estimated time of clearance (e.g., the time to leave the holding fix). An example of holding pattern instructions is shown as 406 of FIG. 4.

As shown in operation 606, the apparatus (e.g., flight management server 102) includes means, such as processing element 201, holding pattern planning application 107, or the like for predicting terminal conditions and adjusting the ETC to derive a total holding time. The total holding time refers to the time entering, flying and exiting a holding pattern. As described herein, predicting terminal conditions comprises accessing data 607 comprising weather data, traffic data, and/or FIXM, WXXM, and AIXM data and calculating an adjusted ETC based upon at least the weather data, traffic data, and/or FIXM, WXXM, and AIXM data. In some embodiments, the processing element 201, holding pattern planning application 107, or the like is configured to obtain or receive from the navigation database 111 information on the holding pattern type including the time-based hold or distance-based hold. For example, when the ATC directs the aircraft to enter the holding pattern, the holding pattern instructions and information including holding pattern type is determined and available for pilots of the aircraft. The processing element 201, holding pattern planning application 107, or the like is configured to optimize the aircraft's execution of the holding pattern as discussed herein.

Thereafter, as shown in operation 608, the apparatus (e.g., flight management server 102) includes means, such as processing element 201, holding pattern planning application 107, or the like for computing a best hold speed (e.g., max endurance speed). The best hold speed or max endurance airspeed being an airspeed that allows for an aircraft to remain flying for the most amount of time, to conserve fuel. Computing the best hold speed is based at least in part on data 607 such as, for example, real-time information about nearby aircrafts, traffic congestion at the airport, availability of runway and current weather conditions at the airport.

As shown in operation 609, the apparatus (e.g., flight management server 102) includes means, such as processing element 201, holding pattern planning application 107, or the like for computing the minimum holding entry pattern time and minimum hold circuit time. As described herein, there is a minimum amount of time required to put the aircraft on a specified course at a specified waypoint. This minimum time is a function of the best hold speed flown by the aircraft as calculated in operation 608 and a holding pattern entry type that needs to be executed to put the aircraft on the desired course.

Computing the minimum holding entry pattern time and minimum hold circuit time comprises accessing data 610 comprising navigation data from a navigation database, performance data from a performance database, and terrain data from a terrain database and calculating the minimum holding entry pattern time and minimum hold circuit time based upon at least the data 610 comprising navigation data, performance data, and/or terrain data. For example, flights over level terrain are often conducted at one altitude or flight level. On the other hand, flights over mountainous terrain require several changes in altitudes or flight levels to account for changes in the elevation of the terrain. As such, these changes in altitudes or flights changes affect the minimum holding entry pattern time and the hold circuit time.

As shown in operation 611, the apparatus (e.g., flight management server 102) includes means, such as processing element 201, holding pattern planning application 107, or the like for adjusting holding inbound length/time such that the estimated aircraft position at the ETC time is on the hold inbound segment. Said differently, when holding at a fix and instructions are received specifying the time of departure from the fix, the flight management server 102 is configured to transmit instructions to the pilot to adjust the aircraft's flight path within the limits of the established holding pattern in order to leave the fix at the exact time specified.

In some embodiments, the flight management server 102 is configured to transmit instructions the length of the straight portion of one more orbits in a "racetrack" holding pattern is adjusted to leave the hold at the necessary time to meet this time of arrival.

As indicated with respect to operation 612, the apparatus (e.g., flight management server 102) includes means, such as processing element 201, holding pattern planning application 107, or the like for inserting/updating the hold into the flight management system 106 and execute the holding pattern.

As shown in operation 613, the apparatus (e.g., flight management server 102) includes means, such as processing element 201, holding pattern planning application 107, or the like for determining whether ATC clearance is received. If the outcome of operation 613 is a "NO" determination, the apparatus (e.g., flight management server 102) includes means, such as processing element 201, holding pattern planning application 107, or the like for returning to operation 605 and executing operations 605-612 until the ATC clearance is received.

If the outcome of operation 613 is a "YES" determination, the apparatus (e.g., flight management server 102) includes means, such as processing element 201, holding pattern planning application 107, or the like for facilitating exiting the holding pattern as shown by operation 614. Thereafter, as shown in operation 615, the apparatus (e.g., flight management server 102) includes means, such as processing element 201, holding pattern planning application 107, or the like for facilitating preparations for approach and landing.

Figure 7:
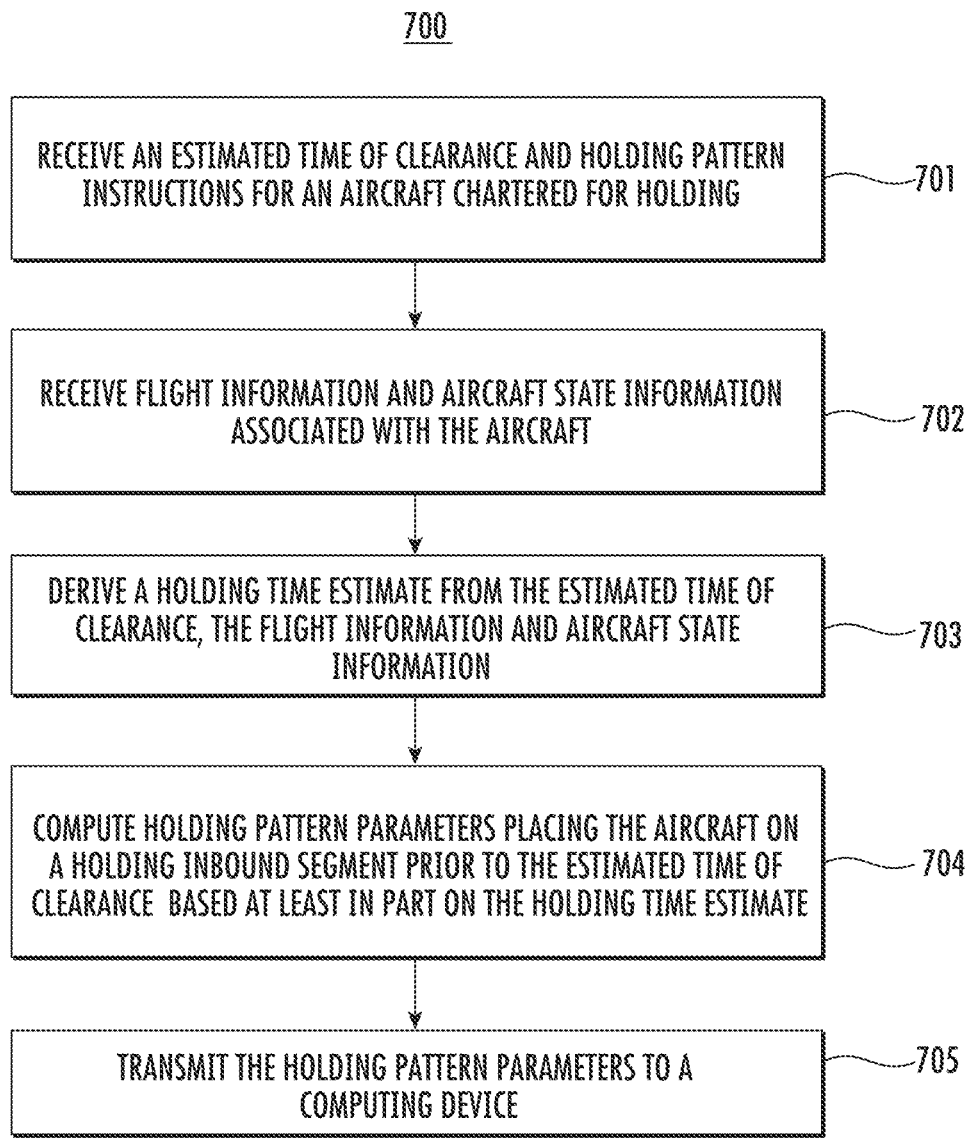
FIG. 7 illustrates an example flowchart, in accordance with some example embodiments described herein; and, FIG. 8 illustrates an exemplary graphical user interface, in accordance with some example embodiments described herein.

FIG. 7 illustrates a flowchart containing a series of operations for optimizing a holding pattern maneuver in a connected environment in accordance with some example embodiments described herein. The operations illustrated in FIG. 7 are, for example, performed by, with the assistance of, and/or under the control of an apparatus (e.g., flight management server 102), as described above. In this regard, performance of the operations invoke one or more of processing element or processing element 201, memory 203, communications interface 204, input/output circuitry 202, and/or holding pattern planning application 107.

As shown in operation 701, the apparatus (e.g., flight management server 102) includes means, such as holding pattern planning application 107, communications interface 204, input/output circuitry 202, or the like, for receiving an estimated time of clearance and holding pattern instructions for an aircraft chartered for holding. As illustrated in FIG. 4, the holding pattern instructions comprises at least the following data: a clearance to the holding fix, a direction to hold from the holding fix, a specified radial, course, or inbound track, an altitude or flight level to be maintained, and the estimated time of clearance (e.g., the time to leave the holding fix). In some example embodiments, the estimated time of clearance and holding pattern instructions for an aircraft chartered for holding is received, via the input/output circuitry 202.

Thereafter, as shown in operation 702, the apparatus (e.g., flight management server 102) includes means, such as holding pattern planning application 107, or the like, for receiving flight information and aircraft state information associated with the aircraft (e.g., data 109-114 of FIG. 1A). As described herein, the flight information comprises enhanced ground proximity warning system (EGPWS) terrain data, weather data, navigation data from a navigation database, crowd-sourced sensor data, air traffic data, flight information exchange model (FIXM) data, weather information exchange model (WXXM) data, or aeronautical information exchange model (AIXM) data. The aircraft state information comprises performance data, historical data, and aircraft data. The performance data comprises recorded trajectory data of the aircraft, aircraft configuration data and an aircraft intent. The historical data pertains to actual holding pattern data of other aircrafts. Aircraft data includes flight performance data, aircraft engine data, or aircraft data relating to aircraft contents, passenger data, or aircraft departure and arrival.

Thereafter, as shown in operation 703, the apparatus (e.g., flight management server 102) includes means, such as processing element 201, holding pattern planning application 107, or the like for deriving a holding time estimate from the estimated time of clearance, the flight information and aircraft state information.

Thereafter, as shown in operation 704, the apparatus (e.g., flight management server 102) includes means, such as the processing element 201, holding pattern planning application 107, or the like for computing holding pattern parameters placing the aircraft on a holding inbound segment prior to the estimated time of clearance based at least in part on the holding time estimate. In some example embodiments, the apparatus (e.g., flight management server 102) includes means, such as the processing element 201, holding pattern planning application 107, or the like for computing hold speed of the aircraft based at least in part on the holding time estimate and the estimated time of clearance and computing a minimum holding entry pattern time and a minimum holding circuit time based at least in part on the hold speed. A minimum holding time based on a total entry distance at a hold speed is calculated to which the optimized holding pattern parameters are updated based on the minimum holding time.

Figure 8:
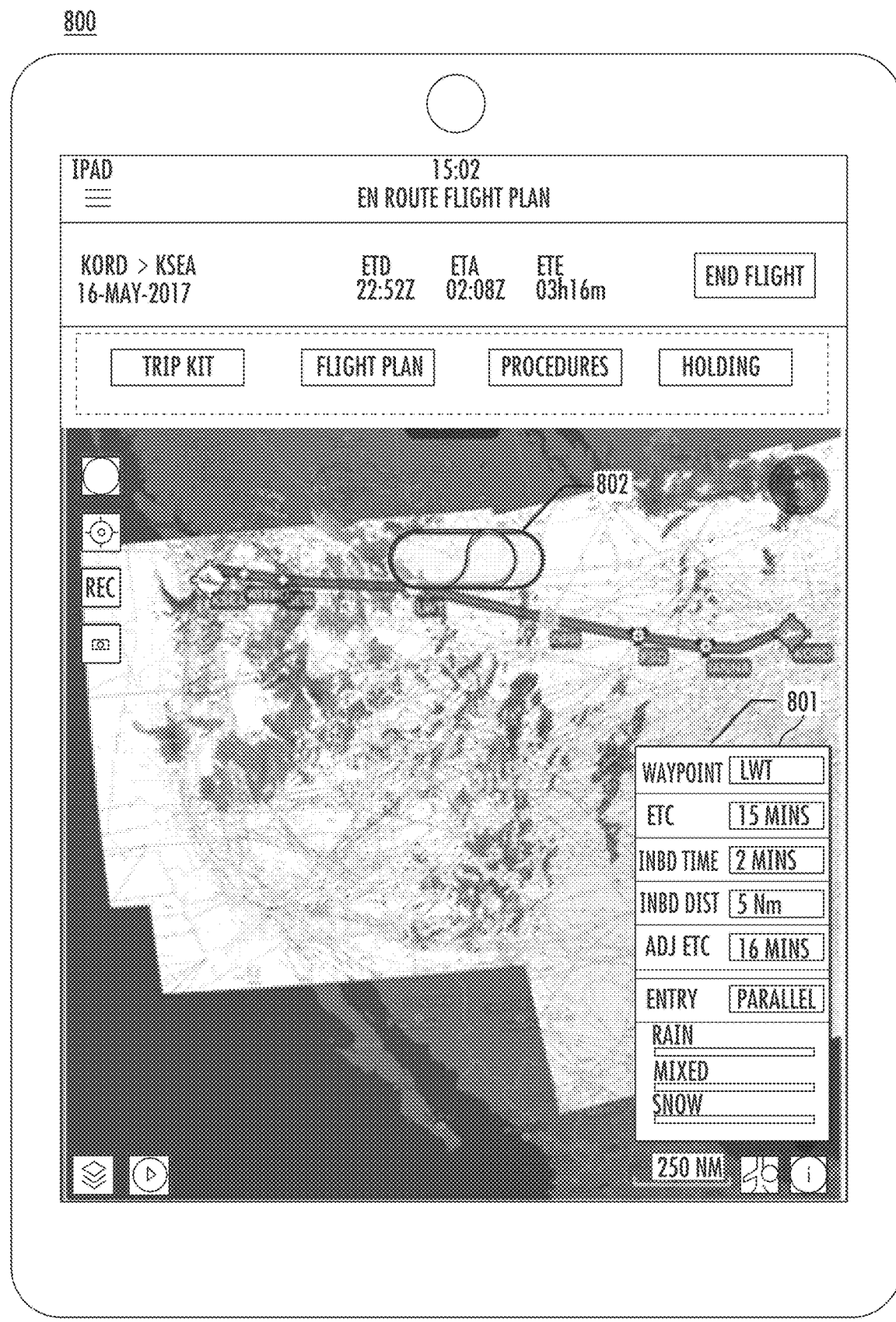

Thereafter, as shown in operation 705, the apparatus (e.g., flight management server 102) includes means, such as the processing element 201, holding pattern planning application 107, or the like for transmitting the holding parameters to a computing device. In some embodiments, the apparatus includes means such as the processing element 201, holding pattern planning application 107, or the like for optionally displaying a visual representation of the optimized holding parameters to a user interface. Such visual representation may be displayed to a user interface associated with, for example, a pilot operating an aircraft or a flight controller. FIG. 8 illustrates an example user interface. As shown in FIG. 8, a user interface is provided to the pilot in which the pilot enters in the hold configuration parameters 801 into the flight management user interface which in turn, the holding pattern planning application is configured to facilitate autopilot operations to control the aircraft using the optimized holding patterns according to the optimized holding pattern 802.

In some embodiments, the apparatus (e.g., flight management server 102) includes means, such as the processing element 201, holding pattern planning application 107, or the like for determining whether clearance has been received and in accordance with a determination that clearance has been received, transmitting exit holding pattern instructions, the exit holding pattern instructions preparing for approach and landing segment. Alternatively, and in accordance with a determination that clearance has not been received, and in accordance with a determination that the estimated time of clearance has elapsed, the apparatus (e.g., flight management server 102) includes means, such as the processing element 201, holding pattern planning application 107, or the like for continuing to compute the optimized holding pattern parameters until clearance is received.

As described above, various technical challenges are surmounted via technical solutions contemplated herein. For instance, example implementations of embodiments of the present disclosure establish the aircraft in the correct position just prior to the holding pattern fix at the estimated clearance time so that the aircraft immediately exits the holding pattern without having to perform excessive turn maneuvers in the holding pattern. This greatly reduces the overall time by several seconds to several minutes for each holding pattern executed.

In another embodiment, the present disclosure intelligently and proactively derives accurate holding pattern time/distance to be used in the flight management system using the GoDirect Flight Planning Application given an estimated time for clearance unlike conventional systems which are reactive and generate inaccurate holding times resulting in approach delays. Moreover, the ATC can regulate incoming traffic into airports more smoothly with less frequent communication with aircrafts. Bursts of air traffic arriving into busy airports at relatively the same time can be streamlined by automatically specifying increments of holding pattern times to aircrafts on a first come first serve basis. For example, in an instance when two airplanes such as Airplane 1 and Airplane 2 come into a terminal area at the same time at a busy airport where ten other airplanes are waiting for landing and the last of the ten airplanes will be landing at a current time+10 minutes, then it should be possible, using embodiments of the present systems and methods described herein, to transmit instructions to Airplane 1 to hold for 11 more minutes and Airplane 2 to Hold for 12 more minutes. Airplane 1 and Airplane 2 will now land at 'current time+11' minutes and 'current time+12' minutes respectively.

Such example implementations confront and solve at least two technical challenges: (1) providing holding flight patterns optimized for efficiency (e.g., thereby lowering overall time spent in holding patterns), and (2) providing more robust holding pattern data for improved assessment and calculation of hold times, leading to efficient operations and reduced carbon emissions.

FIGS. 6B and 7 thus illustrate flowcharts describing the operation of apparatuses, methods, systems, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above is implemented by an apparatus executing computer program instructions. In this regard, the computer program instructions are stored by a memory 203 of the flight management server 102 and executed by a processing element 201 of the flight management server 102. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, may be implemented by special purpose hardware-based computer systems which perform the specified functions, or combinations of special purpose hardware with computer instructions.

Conclusion

Many modifications and other embodiments of the systems and methods described herein set forth herein will come to mind to one skilled in the art to which these systems and methods pertain having the benefit of the teachings presented in the foregoing descriptions and the associated drawings. Therefore, it is to be understood that the systems and methods described herein are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method for determining a holding pattern, the computer-implemented method comprising:
receiving an estimated time of clearance and holding pattern instructions for an aircraft chartered for holding;
receiving flight information and real-time aircraft state information associated with the aircraft;
deriving a holding time estimate from the estimated time of clearance, the flight information, and the real-time aircraft state information;
computing real-time holding pattern parameters placing the aircraft on a holding inbound segment prior to the estimated time of clearance based at least in part on the holding time estimate;
adjusting the real-time holding pattern parameters in response to receiving a specified time of exit for the holding, wherein adjusting is based at least in part on limits of an established holding pattern defined by the real-time holding pattern parameters;
transmitting the adjusted real-time holding pattern parameters to a computing device; and
controlling the aircraft based on the adjusted real-time holding pattern parameters with autopilot operations that are executed by the computing device.

2. The computer-implemented method according to claim 1, wherein computing the real-time holding pattern parameters placing the aircraft on a holding inbound segment prior to the estimated time of clearance based at least in part on the holding time estimate comprises:
computing hold speed of the aircraft based at least in part on the holding time estimate and the estimated time of clearance; and
computing a minimum holding entry pattern time and a minimum holding circuit time based at least in part on the hold speed.

3. The computer-implemented method according to claim 1, further comprising:
determining whether clearance has been received;
in accordance with a determination that clearance has been received, transmitting exit holding pattern instructions, the exit holding pattern instructions preparing for approach and landing segment; and
in accordance with a determination that clearance has not been received, and in accordance with a determination that the estimated time of clearance has elapsed, continuing to dynamically re-compute the real-time holding pattern parameters until clearance is received.

4. The computer implemented method according to claim 1, wherein the flight information comprises at least one of enhanced ground proximity warning system (EGPWS) terrain data, weather data, navigation data from a navigation database, crowd-sourced sensor data, air traffic data, flight information exchange model (FIXM) data, weather information exchange model (WXXM) data, or aeronautical information exchange model (AIXM) data.

5. The computer implemented method according to claim 1, wherein the real-time aircraft state information comprises at least one of performance data or aircraft data.

6. The computer implemented method according to claim 1, further comprising:
calculating a minimum holding time based on a total entry distance at a hold speed, and
computing the real-time holding pattern parameters based on the minimum holding time.

7. The computer implemented method according to claim 1, further comprising:
analyzing historical data from a historical database to determine the holding pattern;
using the historical data to train a machine learning model; and
receiving from the machine learning model a prediction of the holding pattern.

8. The computer-implemented method according to claim 1, further comprising at least an additional portion of flight information or an additional portion of real-time aircraft state information from a second vehicle, wherein the holding time estimate is based at least in part on the additional portion of flight information or the additional portion of real-time aircraft state information.

9. The computer-implemented method according to claim 1, wherein the controlling the aircraft based on the adjusted real-time holding pattern parameters comprises controlling a speed of the aircraft based on the adjusted real-time holding pattern parameters.

10. An apparatus configured to determine a holding pattern, the apparatus comprising at least one processor and at least one non-transitory memory including program code, the at least one non-transitory memory and the program code configured to, with the processor, cause the apparatus to at least:
receive an estimated time of clearance and holding pattern instructions for an aircraft chartered for holding;
receive flight information and real-time aircraft state information associated with the aircraft;
derive a holding time estimate from the estimated time of clearance, the flight information and the real-time aircraft state information;
compute real-time holding pattern parameters placing the aircraft on a holding inbound segment prior to the estimated time of clearance based at least in part on the holding time estimate;
adjust the real-time holding pattern parameters in response to receiving a specified time of exit for the holding, wherein adjusting is based at least in part on limits of an established holding pattern defined by the real-time holding pattern parameters;
transmit the adjusted real-time holding pattern parameters to a computing device; and
controlling the aircraft based on the adjusted real-time holding pattern parameters with autopilot operations that are executed by the computing device.

11. The apparatus according to claim 10, wherein the memory including the program code is further configured to, with the processor, cause the apparatus to:
compute hold speed of the aircraft based at least in part on the holding time estimate and the estimated time of clearance; and
compute a minimum holding entry pattern time and a minimum holding circuit time based at least in part on the hold speed.

12. The apparatus according to claim 10, wherein the memory including the program code is further configured to, with the processor, cause the apparatus to:
- determine whether clearance has been received;
- in accordance with a determination that clearance has been received, transmit exit holding pattern instructions, the exit holding pattern instructions preparing for approach and landing segment; and
- in accordance with a determination that clearance has not been received, and in accordance with a determination that the estimated time of clearance has elapsed, continue to dynamically re-compute the real-time holding pattern parameters until clearance is received.

13. The apparatus according to claim 10, wherein the flight information comprises at least one of enhanced ground proximity warning system (EGPWS) terrain data, weather data, navigation data from a navigation database, crowd-sourced sensor data, air traffic data, flight information exchange model (FIXM) data, weather information exchange model (WXXM) data, or aeronautical information exchange model (AIXM) data.

14. The apparatus according to claim 10, wherein the real-time aircraft state information comprises at least one of performance data or aircraft data.

15. The apparatus according to claim 10, wherein the memory including the program code is further configured to, with the processor, cause the apparatus to:
- calculate a minimum holding time based on a total entry distance at a hold speed; and
- compute the real-time holding pattern parameters based on the minimum holding time.

16. The apparatus according to claim 10, wherein the memory including the program code is further configured to, with the processor, cause the apparatus to:
- analyze historical data from a historical database to determine the holding pattern; and
- use the historical data to train a machine learning model.

17. The apparatus according to claim 16, wherein the memory including the program code is further configured to, with the processor, cause the apparatus to:
- receive from the machine learning model a prediction of the holding pattern.

18. A computer program product comprising at least one non-transitory computer-readable storage medium having computer-readable program code portions stored therein, the computer-readable program code portions comprising an executable portion configured to:
- receive an estimated time of clearance and holding pattern instructions for an aircraft chartered for holding;
- receive flight information and real-time aircraft state information associated with the aircraft;
- derive a holding time estimate from the estimated time of clearance, the flight information and the real-time aircraft state information;
- compute real-time holding pattern parameters placing the aircraft on a holding inbound segment prior to the estimated time of clearance based at least in part on the holding time estimate;
- adjust the real-time holding pattern parameters in response to receiving a specified time of exit for the holding, wherein adjusting is based at least in part on limits of an established holding pattern defined by the real-time holding pattern parameters;
- transmit the adjusted real-time holding pattern parameters to a computing device; and
- controlling the aircraft based on the adjusted real-time holding pattern parameters with autopilot operations that are executed by the computing device.

19. The computer program product according to claim 18, wherein the computer-readable program code portions comprising the executable portion are configured to:
- compute hold speed of the aircraft based at least in part on the holding time estimate and the estimated time of clearance; and
- compute a minimum holding entry pattern time and a minimum holding circuit time based at least in part on the hold speed.

20. The computer program product according to claim 18, wherein the computer-readable program code portions comprising the executable portion are configured to:
- determine whether clearance has been received;
- in accordance with a determination that clearance has been received, transmit exit holding pattern instructions, the exit holding pattern instructions preparing for approach and landing segment; and
- in accordance with a determination that clearance has not been received, and in accordance with a determination that the estimated time of clearance has elapsed, continue to dynamically re-compute the real-time holding pattern parameters until clearance is received.

\* \* \* \* \*